(12) United States Patent
Du et al.

(10) Patent No.: US 12,646,959 B2
(45) Date of Patent: Jun. 2, 2026

(54) MOBILE DEVICE, METHOD AND DEVICE FOR SWITCHING BATTERY THEREOF, AND COMPUTER-READABLE STORAGE MEDIUM

(71) Applicants: Beijing BOE Display Technology Co., Ltd., Beijing (CN); BOE Technology Group Co., Ltd., Beijing (CN)

(72) Inventors: Weihua Du, Beijing (CN); Lili Chen, Beijing (CN); Hao Zhang, Beijing (CN); Peng Han, Beijing (CN); Feng Gao, Beijing (CN); Chao Zheng, Beijing (CN); Xudong Quan, Beijing (CN); Zheng Ge, Beijing (CN); Chaoquan Yao, Beijing (CN); Ruifeng Qin, Beijing (CN); Juanjuan Shi, Beijing (CN); Qianwen Jiang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 100 days.

(21) Appl. No.: 18/649,650

(22) Filed: Apr. 29, 2024

(65) Prior Publication Data

US 2025/0047116 A1 Feb. 6, 2025

Related U.S. Application Data

(63) Continuation of application No. PCT/CN2023/110299, filed on Jul. 31, 2023.

(51) Int. Cl.
H02J 7/00 (2026.01)
H02J 7/50 (2026.01)
H02J 7/96 (2026.01)

(52) U.S. Cl.
CPC ............... H02J 7/855 (2026.01); H02J 7/50 (2026.01); H02J 7/96 (2026.01)

(58) Field of Classification Search
CPC ... H02J 7/0063; H02J 7/007182; H02J 7/0013
(Continued)

(56) References Cited

U.S. PATENT DOCUMENTS

2014/0176046 A1 6/2014 Park et al.

FOREIGN PATENT DOCUMENTS

CN 103227502 A 7/2013
CN 205489787 U 8/2016
(Continued)

OTHER PUBLICATIONS

PCT/CN2023/110299 International search report issued on Mar. 30, 2024.

*Primary Examiner* — Michael R. Fin
(74) *Attorney, Agent, or Firm* — IPro, PLLC

(57) ABSTRACT

A mobile device includes a primary battery and a secondary battery, and the mobile device further includes: a power supply control module and a main control module connected to each other, where the power supply control module is respectively connected to the primary battery and the secondary battery; and the main control module is configured to control the primary battery to supply power to the mobile device when it is determined that the primary battery and the mobile device are in the power-on state; and control a power supply of the mobile device to be switched from the primary battery to the secondary battery when it is determined that the primary battery and the mobile device are in the power-off state.

19 Claims, 7 Drawing Sheets

(58) Field of Classification Search
USPC ........................................................ 307/66
See application file for complete search history.

(56)                              References Cited

FOREIGN PATENT DOCUMENTS

| CN | 106648016 A | 5/2017 |
|----|-------------|--------|
| CN | 207867451 U | 9/2018 |
| CN | 110082916 A | 8/2019 |
| CN | 111277040 A | 6/2020 |
| CN | 211266570 U | 8/2020 |
| CN | 114726017 A | 7/2022 |
| CN | 218352216 U | 1/2023 |

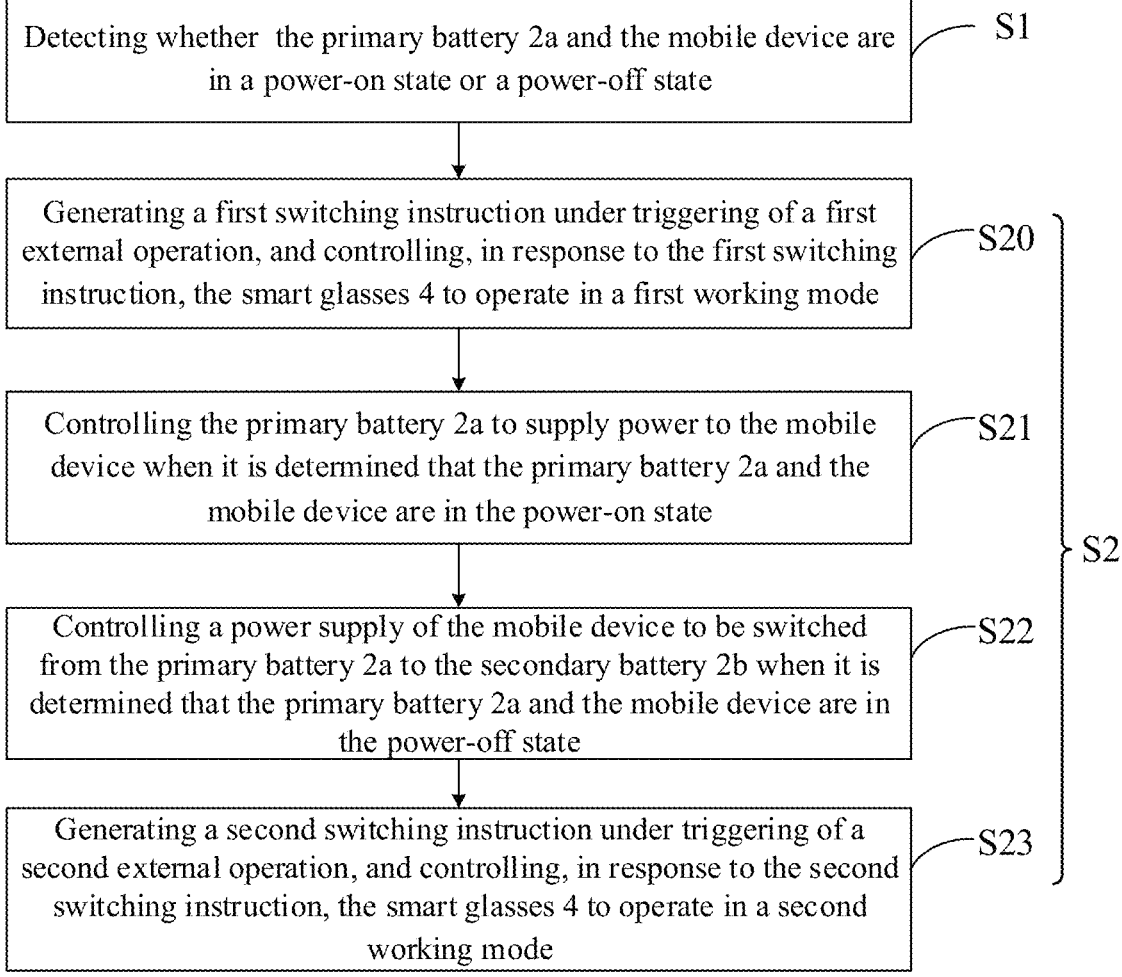

Detecting whether the primary battery 2a and the mobile device are in a power-on state or a power-off state — S1

Generating a first switching instruction under triggering of a first external operation, and controlling, in response to the first switching instruction, the smart glasses 4 to operate in a first working mode — S20

Controlling the primary battery 2a to supply power to the mobile device when it is determined that the primary battery 2a and the mobile device are in the power-on state — S21

Controlling a power supply of the mobile device to be switched from the primary battery 2a to the secondary battery 2b when it is determined that the primary battery 2a and the mobile device are in the power-off state — S22

Generating a second switching instruction under triggering of a second external operation, and controlling, in response to the second switching instruction, the smart glasses 4 to operate in a second working mode — S23

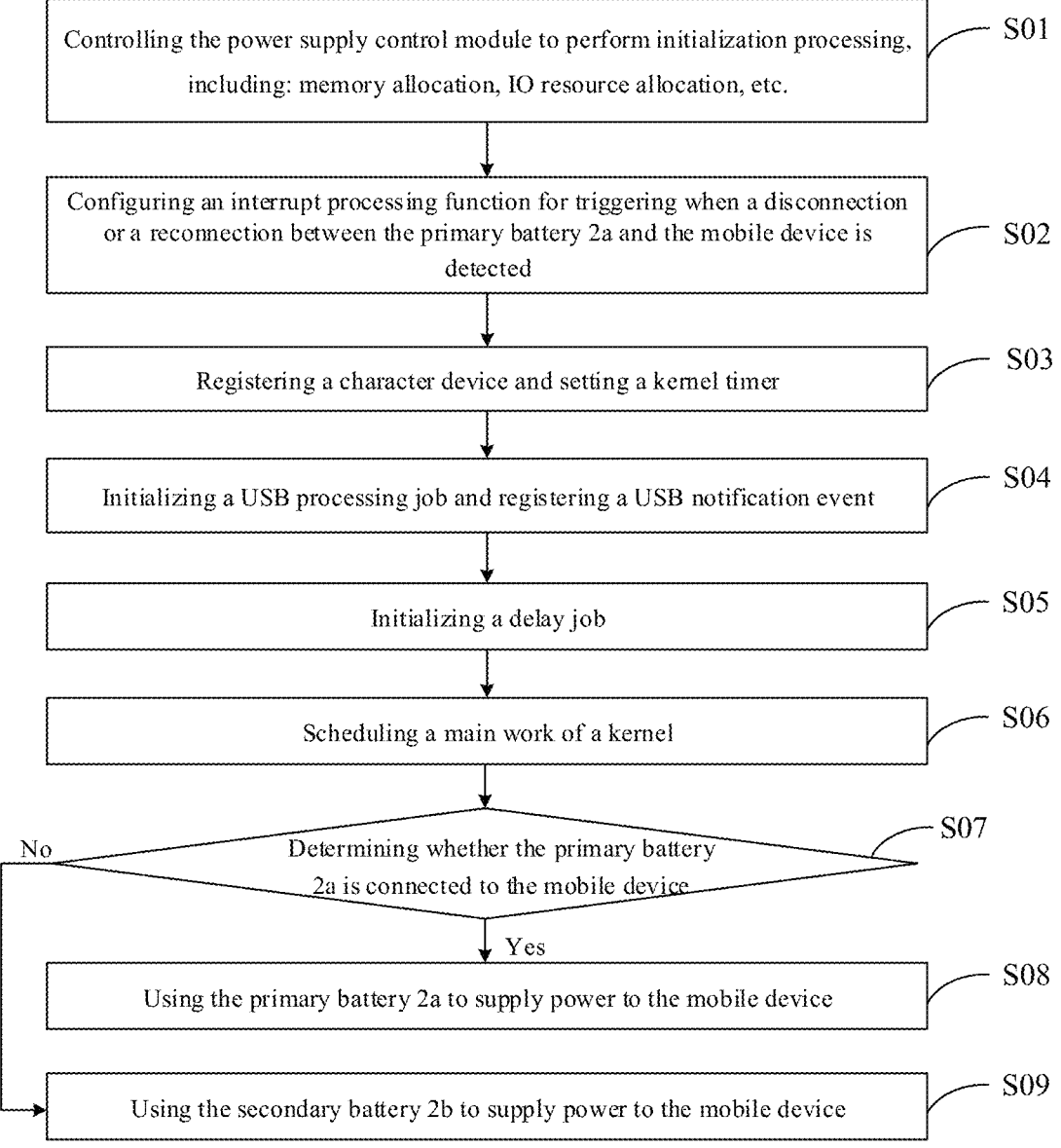

Controlling the power supply control module to perform initialization processing, including: memory allocation, IO resource allocation, etc.                S01

Configuring an interrupt processing function for triggering when a disconnection or a reconnection between the primary battery 2a and the mobile device is detected                S02

Registering a character device and setting a kernel timer                S03

Initializing a USB processing job and registering a USB notification event                S04

Initializing a delay job                S05

Scheduling a main work of a kernel                S06

Determining whether the primary battery 2a is connected to the mobile device                S07

No

Yes

Using the primary battery 2a to supply power to the mobile device                S08

Using the secondary battery 2b to supply power to the mobile device                S09

FIG. 3b

Step S02:

Step S21:

Step S04:

Step S06:

MOBILE DEVICE, METHOD AND DEVICE FOR SWITCHING BATTERY THEREOF, AND COMPUTER-READABLE STORAGE MEDIUM

This application is a continuation application of international application No. PCT/CN2023/110299, filed on Jul. 31, 2023, the disclosure of which is incorporated herein by reference in its entirety.

TECHNICAL FIELD

The present disclosure relates to the field of display technologies, and in particular, relates to a mobile device, a method and device for switching a battery thereof, and a computer-readable storage medium.

BACKGROUND OF THE INVENTION

Smart glasses integrate a main control chip, a communication module, a display module, a camera, an integrated circuit, a power supply system and the like on a glasses apparatus to form an independent operating device, and other external devices do not need to be connected. Generally, a power supply system of the smart glasses adopts a built-in battery for power supply.

In the related art, after a battery of the smart glasses runs out, the smart glasses can only stop working, and can be started again for use after a built-in battery is recharged through a charging port of the smart glasses. In addition, a high-density battery cannot be used due to the limitation of the shape, the size and the wearing weight of the smart glasses and the consideration of the use safety, such that the battery capacity of the built-in battery is greatly limited, thereby limiting the battery life of the smart battery.

In conclusion, the limited battery life makes users unable to use the smart glasses continuously for a long time, which affects the user experience.

SUMMARY OF THE INVENTION

Embodiments of the present disclosure provide a mobile device, a method and device for switching a battery thereof, and a computer-readable storage medium.

In a first aspect, the embodiments of the present disclosure provide a mobile device. The mobile device includes a primary battery and a secondary battery, and the mobile device further includes a power supply control module and a main control module connected to each other, wherein, the power supply control module is respectively connected to the primary battery and the secondary battery and is configured to detect whether the primary battery and the mobile device are in a power-on state or a power-off state and send on-off information to the main control module; and the main control module is configured to control the primary battery to supply power to the mobile device when it is determined that the primary battery and the mobile device are in the power-on state; and control a power supply of the mobile device to be switched from the primary battery to the secondary battery when it is determined that the primary battery and the mobile device are in the power-off state.

In some embodiments, the mobile device further includes smart glasses, the primary battery and the secondary battery are both configured to supply power to the smart glasses, and the mobile device further includes a processing module connected to the main control module, wherein, the main control module is further configured to: generate a first switching instruction under triggering of a first external operation, and send the first switching instruction to the processing module, before controlling the power supply of the mobile device to be switched from the primary battery to the secondary battery; and generate a second switching instruction under triggering of a second external operation, and send the second switching instruction to the processing module, after controlling the primary battery to supply power to the mobile device; and the processing module is configured to: control the smart glasses to operate in a first working mode in response to the first switching instruction; and control the smart glasses to operate in a second working mode in response to the second switching instruction; wherein power consumption of the smart glasses in the first working mode is less than power consumption of the smart glasses in the second working mode.

In some embodiments, the mobile device further includes an electric quantity monitoring module connected to the primary battery, and the electric quantity monitoring module is configured to monitor an electric quantity of the primary battery;

the mobile device further includes an event notification module respectively connected to the main control module and the electric quantity monitoring module, the main control module is further configured to generate a first event instruction and send the first event instruction to the event notification module when it is detected that the primary battery is reconnected with the mobile device; and the event notification module is configured to control the electric quantity monitoring module to reset the electric quantity of the primary battery under triggering of the first event instruction.

In some embodiments, the electric quantity monitoring module is specifically configured to:

call an electric quantity resetting thread to detect and reset the electric quantity of the primary battery, under control of the event notification module; and allow a current variation range generated by the primary battery within a preset time period to be greater than 0.5 A and/or allow a voltage variation range generated by the primary battery within a preset time period to be greater than 1 V under the electric quantity resetting thread, where the preset time period is less than 10 s.

In some embodiments, the main control module is further configured to: monitor an electric quantity of the secondary battery;

control a first signal lamp to be constantly turned on to indicate that the electric quantity of the secondary battery is insufficient, when it is determined that the electric quantity of the secondary battery is lower than a preset electric quantity threshold, where the preset electric quantity threshold is a minimum electric quantity value required by the mobile device during a replacement process of the primary battery; and control the first signal lamp to be turned off, when it is determined that the electric quantity of the secondary battery is not lower than the preset electric quantity threshold.

In some embodiments, before controlling the power supply of the mobile device to be switched from the primary battery to the secondary battery, the main control module is further configured to:

generate the second switching instruction in response to the second external operation, in a case that the first signal lamp is turned off.

In some embodiments, the main control module is further configured to: monitor a voltage value of the primary battery and a voltage value of the secondary battery, respectively; and send, a charging instruction to the power supply control module in a case that the first signal lamp is constantly turned on and it is determined that the voltage value of the primary battery is greater than the voltage value of the secondary battery; and the power supply control module is further configured to charge the secondary battery through the primary battery under control of the charging instruction.

In some embodiments, the main control module is further configured to control the first signal lamp to flash during a charging process of the secondary battery.

In some embodiments, the mobile device further includes a charging module, the charging module is respectively connected to the smart glasses, the primary battery and the power supply control module, and the charging module is provided with a charging port configured to connect one of the smart glasses and an external power supply terminal; and the charging module is configured to:

supply power to the smart glasses in a case that the charging port is connected to the smart glasses; or receive power supplied from the external power supply terminal and charge the secondary battery through the primary battery in a case that the charging port is connected to the external power supply terminal.

In some embodiments, before sending the charging instruction to the power supply control module, the main control module is further configured to detect the power-on state between the charging module and the external power supply terminal; and where in a case that the charging module is connected to the external power supply terminal, the charging instruction is configured to instruct the power supply control module to receive power supplied from the external power supply terminal and output power to the secondary battery through the primary battery; and in a case that the charging module is not connected to the external power supply terminal, the charging instruction is configured to instruct the power supply control module to directly output power of the primary battery to the secondary battery.

In some embodiments, the charging module is further configured to:

supply the power of the primary battery to the smart glasses in a case that the primary battery and the mobile device are in the power-on state; and supply power of the secondary battery to the smart glasses through the power supply control module in a case that the primary battery and the mobile device are in the power-off state.

In some embodiments, the power supply control module is further configured to:

supply the power of the primary battery or the power of the secondary battery to the main control module and the electric quantity monitoring module.

In a second aspect, the embodiments of the present disclosure provide a method for switching a battery of a mobile device. The method is applied to the mobile device according to the first aspect, the mobile device includes the primary battery and the secondary battery, and the method includes:

detecting whether the primary battery and the mobile device are in a power-on state or a power-off state; and controlling the primary battery to supply power to the mobile device when it is determined that the primary battery and the mobile device are in the power-on state; and controlling a power supply of the mobile device to be switched from the primary battery to the secondary battery when it is determined that the primary battery and the mobile device are in the power-off state.

In some embodiments, the mobile device includes the smart glasses, the primary battery and the secondary battery are both configured to supply power to the smart glasses, and before controlling the power supply of the mobile device to be switched from the primary battery to the secondary battery, the method further includes:

generating a first switching instruction under triggering of a first external operation, and controlling the smart glasses to operate in a first working mode in response to the first switching instruction; and after controlling the power supply of the mobile device to be switched back from the secondary battery to the primary battery, the method further includes:

generating a second switching instruction under triggering of a second external operation, and controlling the smart glasses to operate in a second working mode in response to the second switching instruction; where power consumption of the smart glasses in the first working mode is less than power consumption of the smart glasses in the second working mode.

In a third aspect, the embodiments of the present disclosure provide a device for switching a battery of a mobile device. The device includes:

at least one processor; and a memory in communication connection with the at least one processor; wherein the memory stores one or more computer programs executable by the at least one processor, and the one or more computer programs, when executed by the at least one processor, cause the at least one processor to perform the method for switching a battery of a mobile device according to the second aspect.

In a fourth aspect, the embodiments of the present disclosure provide a computer-readable storage medium having a computer program stored therein. The computer program, when executed by a processor of a device, causes the device to perform the method for switching a battery of a mobile device according to the second aspect.

In the mobile device according to the embodiments of the present disclosure, the primary battery and the secondary battery are both configured to supply power, and the power supply control module is configured to detect whether the primary battery is connected to the mobile device; and use, in a case that the primary battery and the mobile device are in the power-on state, the primary battery to supply power to the mobile device, and use, in a case that the primary battery and the mobile device, the secondary battery to supply power to the mobile device are in the power-off state. Above-mentioned "the primary battery and the mobile device are in the power-off state" means that the electric quantity of the primary battery is insufficient, the primary battery needs to be replaced. In this case, the secondary battery may be adopted to supply power to the mobile device during the replacement process of the primary battery, such that the mobile device remains the operating state throughout, that is, the primary battery is replaced without the mobile device being powered off, thereby prolonging the battery life of the mobile device and improving the user experience.

BRIEF DESCRIPTION OF THE DRAWINGS

The accompanying drawings, which are included to provide a further understanding of the embodiments of the present disclosure and constitute a part of the specification, serve to explain the present disclosure together with the embodiments of the present disclosure, and are not to be construed as limiting the present disclosure. In the drawings:

FIG. 3a is a flowchart of a method for switching a battery of a mobile device according to an embodiment of the present disclosure.

FIG. 3b is a flowchart of another method for switching a battery of a mobile device according to an embodiment of the present disclosure.

DETAILED DESCRIPTION

Figure 1:
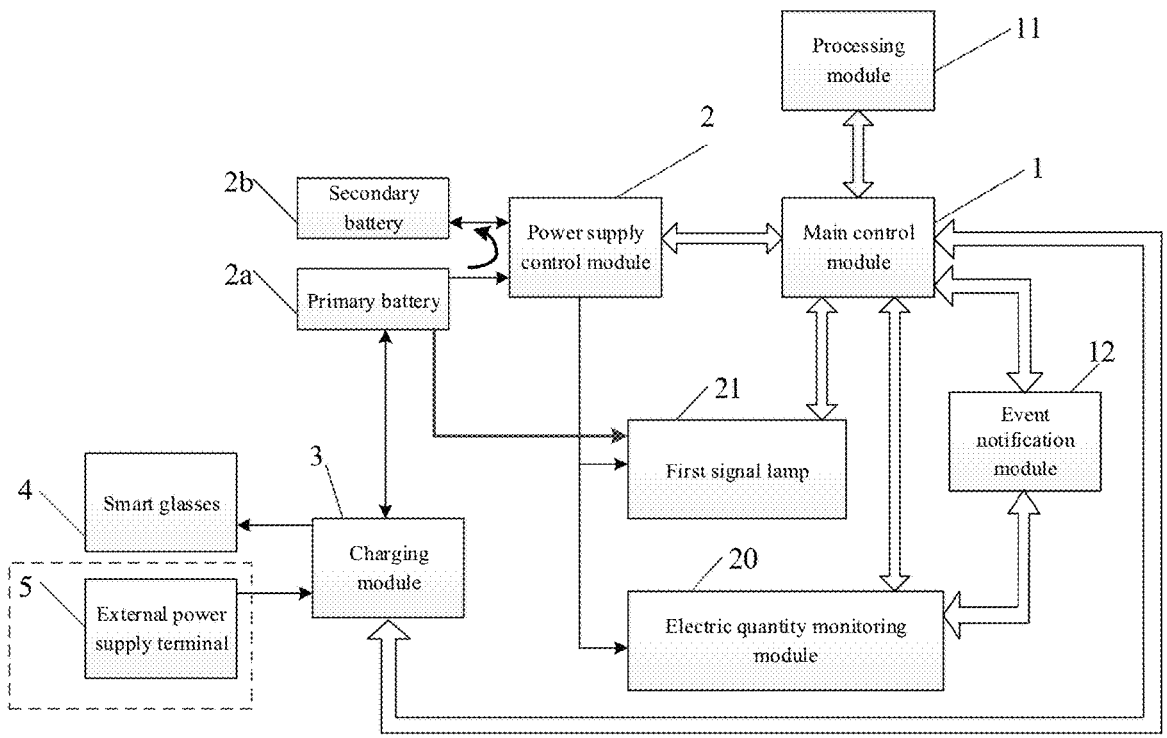
FIG. 1 is a schematic structural diagram of a mobile device according to an embodiment of the present disclosure.

Embodiments of the present disclosure will be described in detail below with reference to the accompanying drawings. It should be understood that specific embodiments described herein are merely illustration and explanation of the present disclosure and do not limit the present disclosure.

For clearer descriptions of the objectives, technical solutions, and advantages of the embodiments of the present disclosure, the technical solutions in the embodiments of the present disclosure are clearly and completely described below with reference to the accompanying drawings of the embodiments of the present disclosure. Apparently, the described embodiments are merely some embodiments of the present disclosure, rather than all of the embodiments. All other embodiments obtained by those ordinary skill in the art through the described embodiments of the present disclosure without making creative efforts shall fall within the protection scope of the present disclosure.

Unless otherwise defined, technical or scientific terms used in the embodiments of the present disclosure should have the ordinary meanings as understood by those of ordinary skill in the art to which the present disclosure belongs. The terms "first", "second", and other similar words, as used in the present disclosure, do not indicate any order, quantity, or importance, but are merely defined to distinguish different components. The terms "include", "comprise", or other similar words mean that the elements or objects stated before them encompass the elements or objects and equivalents thereof listed after them, but do not exclude other elements or objects. The terms "connecting", "connected", or other similar words are not limited to physical or mechanical connections, but may include electrical connections, whether direct or indirect. The terms "up", "down", "left", "right", and the like are merely defined to indicate relative positional relationships. In the case that the absolute position of a described object changes, the relative positional relationships may also change accordingly.

Smart glasses integrate a main control chip, a communication module, a display module, a camera, an integrated circuit, a power supply system and the like on a glasses apparatus to form an independent operating device, and other external devices do not need to be connected. Generally, a power supply system of the smart glasses adopts a built-in battery for power supply.

In the related art, as a wearable device, the smart glasses are in close contact with a human body. In order to reduce the damage to the human body caused by potential risks such as spontaneous combustion and explosion which may be generated during battery charging, after the battery of the smart glasses runs out, it is not allowed to charge the built-in battery while wearing the smart glasses, the smart glasses have to stop working, and the device may be restarted for use after the built-in battery is recharged through the charging port of the smart glasses.

In addition, due to the limitation of the shape, the size and the wearing weight of the smart glasses and the consideration of the use safety, the density and the unit volume capacity of the built-in battery in the smart glasses must be within a safe and controllable range, and a high-density battery cannot be used, such that the battery capacity of the built-in battery is greatly limited, thereby limiting the battery life of the smart battery. Under this premise, the limited battery life makes users unable to use the smart glasses continuously for a long time, which affects the user experience.

In order to solve at least one of the above technical problems, embodiments of the present disclosure provide a mobile device being capable of replacing a battery in an operating state, such that the battery life of the mobile device is prolonged.

FIG. 1 is a schematic structural diagram of a mobile device according to an embodiment of the present disclosure, and as shown in FIG. 1, the mobile device includes a primary battery 2a, a secondary battery 2b, and a power supply control module 2 and a main control module 1 which are connected to each other.

The power supply control module 2 is respectively connected to the primary battery 2a and the secondary battery 2b, and the power supply control module 2 is configured to detect whether the primary battery 2a and the mobile device are in a power-on state or a power-off state and send it to the main control module 1; and the main control module 1 is configured to: control the primary battery 2a to supply power to the mobile device when it is determined that the primary battery 2a and the mobile device are in the power-on state; and control the power supply of the mobile device to be switched from the primary battery 2a to the secondary battery 2b when it is determined that the primary battery 2a and the mobile device are in the power-off state.

In the mobile device according to the embodiments of the present disclosure, the primary battery 2a and the secondary battery 2b are both configured to supply power, the power supply control module 2 is configured to detect whether the primary battery 2a is connected to the mobile device, and in a case that the primary battery and the mobile device are in the power-on state, the primary battery 2a is used to supply power to the mobile device, and in a case that the primary battery and the mobile device are in the power-off state, the secondary battery 2b is used to supply power to the mobile device. Above-mentioned "the primary battery 2a and the mobile device are in the power-off state" means that the electric quantity of the primary battery 2a is insufficient, the primary battery needs to be replaced. In this case, the secondary battery 2b may be adopted to supply power to the mobile device during the replacement process of the primary battery 2a, such that the mobile device remains the operating state throughout, that is, the primary battery 2a is replaced without the mobile device being powered off, thereby prolonging the battery life of the mobile device and improving the user experience.

It should be understood that the primary battery 2a is a detachable battery, and the secondary battery 2b is a non-detachable battery built in the mobile device. In addition, "power-on state" means that the primary battery is electrically connected to the mobile device; and "power-off state" means that the electrical connection between the primary battery and the mobile device is interrupted, for example, the primary battery runs out and cannot supply power to the mobile device, and no current is present between the primary battery and the power supply control module; or the primary battery is removed from the mobile device, and no physical connection is present between the primary battery and the mobile device.

In addition, in the embodiments of the present disclosure, the power supply control module 2 is respectively connected to the primary battery 2a and the secondary battery 2b, so as to avoid a direct shutdown of the system due to a sudden drop of one of the power supplies. However, such an arrangement also brings a problem that current recharge is required to be avoided. Normally, an anti-current recharge circuit may adopt a transistor device, the stability of the circuit is maintained by using the unidirectional conductivity of the transistor, but the addition of the transistor may cause a large voltage drop at the output end of the battery, and further causes the loss of the electric quantity of the battery. Based on the above consideration, the power supply control module 2 in the embodiments of the present disclosure employs an AW3312 type chip, which has a small volume and internal resistance, and a small voltage drop of the output voltage, so the problem of current recharge in the case that the primary battery 2a is detached can be prevented, and the loss of the electric quantity of the battery is also avoided.

In some embodiments, the main control module 1 may be a chip with a model of RK3399Pro, which can run the operating system of Android 9, and is equipped with a six-core ARM architecture CPU with a main frequency of 1.8 GHz as the data processing and control module of the whole mobile device.

In some embodiments, the mobile device includes smart glasses 4, and the primary battery 2a and the secondary battery 2b are both configured to supply power to the smart glasses 4.

In other embodiments of the present disclosure, the used mobile device may also be a video camera, an intercom, a recorder, etc., and specific types of the mobile device are not limited in the embodiments of the present disclosure.

The mobile device further includes a charging module 3, the charging module 3 is respectively connected to the smart glasses 4, the primary battery 2a and the power supply control module 2, and the charging module 3 is configured to: supply power of the primary battery 2a to the smart glasses 4 in a case that the primary battery 2a and the mobile device are in the power-on state; and supply power of the secondary battery 2b to the smart glasses 4 through the power supply control module 2 in a case that the primary battery 2a and the mobile device are in the power-off state.

Furthermore, as shown in FIG. 1, in the case that the primary battery 2a and the mobile device are in the power-on state, that is, the primary battery 2a supplies power to the mobile device, the power supply path thereof is divided into two paths, one path directly supplies power to the smart glasses 4 through the charging module 3, and the other path supplies power to other functional modules other than the charging module 3 in the mobile device through the power supply control module 2. In the case that the primary battery 2a and the mobile device are in the power-off state, that is, the secondary battery 2b supplies power to the mobile device, the secondary battery 2b cannot directly supply power to the charging module 3, and it can only connect to the charging module 3 through the power supply control module 2 and supply power to the charging module 3.

As can be seen from the above embodiments, in order to avoid the current recharge caused by power supply drop and the loss of the electric quantity, the power supply control module 2 with small volume and internal resistance and low voltage drop of the output voltage is adopted, that is, the output power of the power supply control module 2 is also small. In this case, when the secondary battery 2b supplies power to the mobile device, as the output power of the power supply control module 2 is small, even though sufficient electric quantity can be supplied to the charging module 3, the power is not sufficient to support the operation of the smart glasses 4, but only to maintain the smart glasses 4 in the power-on state.

In view of this, in some embodiments, the mobile device further includes a processing module 11 connected to the main control module 1.

The main control module 1 is further configured to: generate a first switching instruction under the triggering of a first external operation and send the first switching instruction to the processing module 11, before the power supply of the mobile device is controlled to be switched from the primary battery 2a to the secondary battery 2b, and generate a second switching instruction under the triggering of a second external operation and send the second switching instruction to the processing module 11, after the power supply of the mobile device is controlled to be switched back from the secondary battery 2b to the primary battery 2a.

The processing module 11 is configured to: control the smart glasses 4 to operate in a first working mode in response to the first switching instruction; and control the smart glasses 4 to operate in a second working mode in response to the second switching instruction. Power consumption of the smart glasses 4 in the first working mode is less than power consumption of the smart glasses 4 in the second working mode.

The processing module 11 may be a chip structure built in the mobile device, or may be a software system capable of performing communication connection with the main control module 1, which is not limited in the embodiments of the present disclosure.

In the case that the secondary battery 2b supplies power to the mobile device, the processing module 11 controls the smart glasses 4 to be switched to the first working mode, in which the power consumption is lower, and then to be switched back to the second working mode after the primary battery 2a is replaced.

In one example, the smart glasses 4 have functions of image (video) capture, image (video) processing, image (video) display, etc. In the second working mode, the smart glasses 4 may call the above functions normally, and in the first working mode, the smart glasses 4 are adjusted to be in the low power consumption state, and the above functions are all deactivated temporarily.

In the same example as the above example, the first external operation may be that an operator performs a double-click operation on a volume down key on the mobile device, and the second external operation may be that an operator performs a double-click operation on a volume up key on the mobile device, and in addition, the two external operations may also be that other function keys on the mobile device are triggered, and the action of the triggering operation is not limited to double click, and may also be long press, triple click, etc., which is not limited in the embodiments of the present disclosure.

In some embodiments, an operator double-clicks a volume down key before replacing the primary battery 2a, the main control module 1 generates a first switching instruction under the triggering of the operation and sends the first switching instruction to the processing module 11. The processing module 11 controls the working mode of the smart glasses 4 to be a second working mode, in response to the first switching instruction. At this moment, the smart glasses 4 are in a low power consumption mode. Furthermore, an operator performs the replacement operation of the primary battery 2a, and after the replacement is completed, the operator double-clicks a volume up key. The main control module 1 generates a second switching instruction under the triggering of the operation and sends the second switching instruction to the processing module 11. The processing module 11 controls the working mode of the smart glasses 4 to be a second working mode, in response to the second switching instruction. At this moment, the switching action of the primary battery 2a is completed, such that the battery life of the smart glasses 4 is prolonged.

In addition, as described in the foregoing embodiments, the power supply control module 2 employs an AW3312 type chip having a maximum load current of 2 A, and in the case that the battery voltage is 3.7 V, the power capable of driving the system is about 7.4 W. In the mobile device, the power of the smart glasses 4 is 8 W, and the total power of the functional modules (the main control module 1, the charging module 3, etc.) other than the smart glasses 4 in the mobile device is 6.8 W. In the case that the smart glasses 4 are in the first working mode, the power supply control module 2 can meet the power requirement of the whole mobile device, solving the problem of insufficient power supply power of the power supply control module 2, and realizing that the power supply control module 2 with a low power completes the switching of batteries of the mobile device with a high power.

In addition, as the primary battery 2a is replaced without the mobile device/smart glasses 4 being powered off, the replacement time is extremely short. Compared with the solution in the related art in which it is required to power off the mobile device/smart glasses 4 and restart the built-in system environment, and the battery replacement takes about 20 s. In the embodiments of the present disclosure, an operator only needs to remove the battery that runs out and install another battery with sufficient electric quantity, and the battery replacement takes less than 5 s, such that the battery replacement time is greatly shortened, the continuous use of users is not affected, and the user experience is improved.

In some embodiments, the charging module 3 is provided with a charging port configured to connect one of the smart glasses 4 and an external power supply terminal 5.

As a wearable device, the smart glasses 4 are in close contact with a human body, and in order to reduce the damage to the human body caused by potential risks such as spontaneous combustion and explosion which may be generated during battery charging, it is not allowed to charge the built-in battery while wearing the smart glasses after the battery of the smart glasses 4 runs out. Above-mentioned "charging the built-in battery" refers to a case where the primary battery 2a is charged through the external power supply terminal 5. In view of this, an application scenario where the smart glasses 4 are used while the charging is performed does not occur and thus the charging module 3 is provided with only one charging port to simplify the hardware design.

In one example, the charging port may be a Type-C interface.

In some embodiments, the charging module 3 is specifically configured to: supply power to the smart glasses 4 in the case that the charging port is connected to the smart glasses 4; or receive power supplied from the external power supply terminal 5 and charge the secondary battery 2b through the primary battery 2a in the case that the charging port is connected to the external power supply terminal 5.

In addition, the external power supply terminal 5 may directly charge the primary battery 2a, but in the embodiments of the present disclosure, only a process of replacing the primary battery 2a without the smart glasses 4 being powered off is described, and a process of placing the primary battery 2a in the mobile device and charging through the external power supply terminal 5 will not be repeated herein.

The process of charging the secondary battery 2b will be described in detail below by specific embodiments, in conjunction with the functions of the charging module 3 and the power supply control module 2.

In some embodiments, the main control module 1 is further configured to: detect a voltage value of the primary battery 2a and a voltage value of the secondary battery 2b, respectively every first preset duration, and send a charging instruction to the power supply control module 2, when it is determined that the voltage value of the primary battery 2a is greater than the voltage value of the secondary battery 2b. The power supply control module 2 is further configured to charge the secondary battery 2b through the primary battery 2a under the control of the charging instruction.

It should be understood that, as the secondary battery 2b is only configured to be temporarily switched to be a power supply terminal of the mobile device during the replacement process of the primary battery 2a, the electric quantity saturation value of the primary battery 2a is much greater than that of the secondary battery 2b. Moreover, in the embodiments of the present disclosure, the secondary battery 2b is charged for the replacement when the electric quantity of the primary battery 2a is sufficient, in case the electric quantity of the primary battery 2a is insufficient.

In one example, the electric quantity saturation value of the primary battery 2a is 10000-15000 mA, and the electric quantity saturation value of the secondary battery 2b is 1000-2500 mA, which is not limited in the embodiments of the present disclosure.

Furthermore, whether a charging condition is met may be determined by detecting voltage values of the primary battery 2a and the secondary battery 2b, that is, whether the electric quantity of the primary battery 2a can support charging of the secondary battery 2b is determined. On the premise that the charging condition is met, the main control module 1 sends a charging instruction to the power supply control module 2, such that the power supply control module 2 charges the secondary battery 2b through the primary battery 2a, and two charging paths for the secondary battery 2b may be provided, specifically, as follows.

In some embodiments, before sending the charging instruction to the power supply control module 2 upon determining that the voltage value of the primary battery 2a is greater than the voltage value of the secondary battery 2b, the main control module 1 is further configured to:

detect a power-on state between the charging module 3 and the external power supply terminal 5. In the case that the charging module 3 is connected to the external power supply terminal 5, the charging instruction is configured to instruct the power supply control module 2 to receive the power supplied from the external power supply terminal 5 and output the power to the secondary battery 2b through the primary battery 2a. In the case that the charging module 3 is not connected to the external power supply terminal 5, the charging instruction is configured to instruct the power supply control module 2 to directly output the power of the primary battery 2a to the secondary battery 2b.

As described in the foregoing embodiments, the charging module 3 is provided with a charging port configured to connect one of the smart glasses 4 and the external power supply terminal 5. In the case that the charging port is connected to the external power supply terminal 5, the charging path for the secondary battery 2b is: the external power supply terminal 5→the charging module 3→the primary battery 2a→the power supply control module 2→the secondary battery 2b. In the case that the charging port is not used and is not connected to the external power supply terminal 5, the charging path for the secondary battery 2b is: the primary battery 2a→the power supply control module 2→the secondary battery 2b.

In some embodiments, as shown in FIG. 1, the mobile device further includes a first signal lamp 21 configured to reflect the state of the electric quantity of the secondary battery 2b.

Specifically, the main control module 1 is further configured to detect the electric quantity of the secondary battery 2b every second preset duration.

When it is determined that the electric quantity of the secondary battery 2b is lower than a preset electric quantity threshold, a first signal lamp 21 is controlled to be constantly turned on to indicate that the electric quantity of the secondary battery 2b is insufficient. The preset electric quantity threshold is a minimum electric quantity value required by the mobile device during a replacement process of the primary battery 2a. When it is determined that the electric quantity of the secondary battery 2b is determined to be not lower than the preset electric quantity threshold, the first signal lamp 21 is controlled to be turned off. The first signal lamp 21 is controlled to flash during the process of charging the secondary battery 2b by the power supply control module 2 under the control of the charging instruction.

It should be understood that the primary battery 2a is replaced on the premise that the secondary battery 2b is ensured to have enough electric quantity, such that the mobile device is not powered off during the replacement process of the primary battery 2a. Therefore, the main control module 1 needs to monitor the electric quantity of the secondary battery 2b to ensure that the replacement of the primary battery 2a is supported at any time without the mobile device being in a power-off state.

In the embodiments of the present disclosure, the electric quantity of the secondary battery 2b is reflected through the state of the first signal lamp 21, such that users can intuitively determine whether the replacement condition of the primary battery 2a is currently met. Specifically, in the case that the electric quantity of the secondary battery 2b is lower than the preset electric quantity threshold, the mobile device cannot be separately powered, so an operator needs to be prompted by the first signal lamp 21 in the case that the electric quantity of the secondary battery 2b is lower than the preset electric quantity threshold, and the primary battery 2a can be replaced after charging. At this moment, the operator is prompted by keeping the first signal lamp 21 constantly turned on. During charging, the first signal lamp 21 flashes to indicate that charging is in progress; and the indicator lamp is turned off to indicate that the electric quantity is full.

The electric quantity monitoring process of the primary battery 2a will be described in detail below with reference to specific embodiments.

In some embodiments, as shown in FIG. 1, the mobile device further includes an electric quantity monitoring module 20 connected to the primary battery 2a, and the electric quantity monitoring module 20 is configured to monitor an electric quantity of the primary battery 2a.

It should be noted that the electric quantity of the primary battery 2a is measured by the electric quantity monitoring module 20 built in the mobile device, but in the actual measurement process, it is found that when the system is in a standby state, after the primary battery 2a is replaced, the electric quantity of the battery displayed is still the previous electric quantity of the primary battery 2a, and the electric quantity of the primary battery 2a cannot be updated in time. This is because an algorithm of avoiding a sudden variation of the electric quantity is present in the strategy of measuring the electric quantity by an electric quantity meter, and the basis of measuring the electric quantity by the electric quantity meter is to test an output voltage of a battery, when the peak load current of the system is large, the battery voltage may be lowered, and in order to prevent this from misjudging the electric quantity of the battery, the electric quantity monitoring module 20 may avoid the emergence of the sudden variation of the electric quantity when the output voltage of the battery suddenly changes greatly. At this moment, it is necessary to realize a function of forced power reset after the battery is replaced as follows.

Above-mentioned "the output voltage of the battery suddenly changes greatly" refers to a case where a voltage variation range generated by the primary battery within a preset time period is greater than 1 V, where the preset time period may be less than 10 s. The voltage variation range value generated when the voltage suddenly changes and the duration of the preset time period may also be other values, which are not limited in the present disclosure.

In some embodiments, the mobile device further includes an event notification module 12, and the event notification module 12 is respectively connected to the main control module 1 and the electric quantity monitoring module 20. The main control module 1 is further configured to generate a first event instruction and send the first event instruction to the event notification module 12 upon detecting that the primary battery 2a has re-established a connection with the mobile device. The event notification module 12 is configured to: control the electric quantity monitoring module 20 to reset the electric quantity of the primary battery 2a under the triggering of the first event instruction.

Furthermore, the electric quantity monitoring module 20 is specifically configured to call an electric quantity resetting thread to detect and reset the electric quantity of the primary battery 2a under the control of the event notification module 12, and allow a current variation range generated by the primary battery within a preset time period to be greater than 0.5 A and/or allow a voltage variation range generated by the primary battery within the preset time period to be greater than 1 V under the electric quantity resetting thread, where the preset time period is less than 10 s.

That is, under the control of the event notification module 12, the electric quantity monitoring module 20 no longer uses the monitoring path for avoiding the sudden variation of the current, but calls the electric quantity resetting thread to monitor the electric quantity of the primary battery 2a. At this moment, the electric quantity monitoring module 20 can monitor and record the real electric quantity of the primary battery 2a without being affected by the sudden variation of the current.

In the embodiments of the present disclosure, the main control module in the mobile device may be a main control chip adopting a Linux kernel operating system, and the system architecture is divided into five layers, which are, from bottom to top, a Linux kernel layer, a hardware abstraction layer, a system runtime layer, an application framework layer, and an application layer. The core system service of the system is based on the Linux kernel, and program security, network protocol, memory management, process management and drivers are all provided by the Linux kernel.

The Linux kernel uses the mechanism of notifier chains to perform event notification among subsystems of the kernel, and four types of notifier chains are as follows: 1) atomic notifier chains: the callback function of the notifier chains runs in an interrupt or atomic context, and blocking are not allowed; 2) blocking notifier chains: the callback function of the notifier chains runs in a process context, and blocking are allowed; 3) raw notifier chains: the callback function of the notifier chains is not limited, and callers maintain the locking and protection; and 4) SRCU notifier chains: a variant of the blocking notifier chains.

The event notification module may be implemented in a driver of the kernel layer of the system, and based on the electric quantity monitoring module 20 and the main control module 1, an event notification module 12 is additionally arranged, which uses the Linux kernel notifier mechanism program (i.e., the notifier mechanism of blocking notifier chains) to perform event notification among subsystems of the kernel. By using the mechanism, in the case that the main control module 1 determines that the replacement of the primary battery is completed, the event is notified to the electric quantity monitoring module 20, such that the electric quantity is forcibly reset in the electric quantity monitoring module 20.

Figure 2:
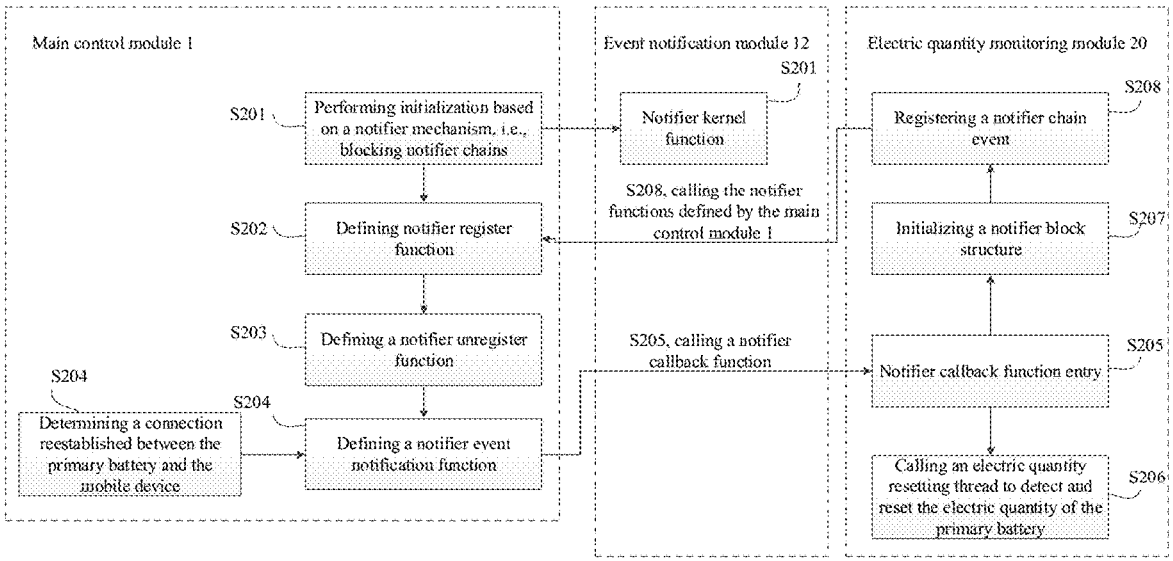
FIG. 2 is a flowchart of power resetting according to an embodiment of the present disclosure.

FIG. 2 is a flowchart of electric quantity resetting according to some embodiments of the present disclosure, and as shown in FIG. 2, the method includes steps S201 to S209, which are specifically as follows.

In step S201, the main control module 1 is initialized based on the notifier mechanism of blocking notifier chains provided by the event notification module 12, and the notifier mechanism notifies events among the modules. Steps S201' and S202 are performed separately.

In step S201', the main control module 1 completes initialization and returns the notifier kernel function to the event notification module 12.

In step S202, the main control module 1 defines a notifier register function.

In step S203, the main control module 1 defines a notifier unregister function.

Specifically, the main control module 1 defines the notifier register function and the notifier unregister function by using the notifier API provided by the event notification module 12, and these functions are taken as entries for other drivers to bind the notifier events of the main control module.

In step S204, the main control module 1 defines a notifier event notification function. In the case that the main control module 1 determines that a connection is reestablished between a new primary battery and the mobile device, the notifier event notification function is called.

In step S205, the event notification module 12 triggers a notifier callback function entry in the electric quantity monitoring module 20 through the notifier event notification function. Steps S206 and S207 are performed.

In step S206, the electric quantity monitoring module 20 calls the electric quantity resetting thread to detect and reset the electric quantity of the primary battery 2a.

In step S207, the electric quantity monitoring module 20 initializes a notifier block structure at the same time.

In step S208, the notifier functions defined by the main control module 1 are called by the event notification module 12, a notifier chain event is registered, and the reset electric quantity is fed back to the main control module 1.

In a specific example, the secondary battery has sufficient electric quantity, the operator can trigger a first external operation, the main control chip sends a first switching instruction to the processing module in response to the first external operation, and the processing module controls the smart glasses to operate in a first working mode (that is, the smart glasses are controlled to operate in a low power consumption mode) in response to the first switching instruction. At this moment, the smart glasses are in an operating state, but the functions of image/video capture, processing, display, etc. are all deactivated by the processing module.

Furthermore, the operator removes the primary battery having insufficient electric quantity and replaces another primary battery having sufficient electric quantity. In this process, the secondary battery 2b supplies power to each of the functional modules in the mobile device through the power supply control module 2 to maintain the operating state of the mobile device, such that the primary battery can be replaced without the mobile device being powered off, thereby improving the battery replacement efficiency and prolonging the battery life of the mobile device.

Furthermore, the operator may trigger a second external operation, the main control module generates a second switching instruction in response to the second external operation and sends the second switching instruction to the processing module, and the processing module controls the smart glasses to operate in a second working mode in response to the second switching instruction. At this moment, the image function of the smart glasses is activated.

Specifically, the processing module may be master computer software in communication connection with the main control module, and the processing module is configured to control the operation of the smart glasses. Specifically, the processing module is provided with application programs corresponding to the functions of the smart glasses, and programs that can be closed during the replacement of the primary battery are picked out to reduce power consumption redundancy caused by the smart glasses, such that the whole mobile device can be kept in a non-power-off state in the case that the power supply is switched from the primary battery to the secondary battery.

In addition, a connection is reestablished between the primary battery and the mobile device, that is, after the primary battery is replaced, the power supply of the mobile device is switched back from the secondary battery to the primary battery, at this moment, the load current of the mobile device suddenly changes, and meanwhile, the voltage of the battery is lowered, and in order to prevent the electric quantity monitoring module from misjudging the detection of the electric quantity of the primary battery, the function of forced power reset needs to be activated.

Based on this, after detecting that the replacement of the primary battery is completed, the main control module generates a first event instruction and sends the first event instruction to the event notification module, and the event notification module controls the electric quantity monitoring module to call an electric quantity resetting thread to detect the electric quantity of the primary battery in response to the first event instruction. At this moment, the electric quantity monitoring module detects the real electric quantity of the primary battery.

In one example, the main control module generates a first event instruction while generating a second switching instruction in response to the second external operation, and sends the first event instruction to the event notification module. In another example, the power supply control module detects whether the primary battery and the mobile device are in a power-on state or a power-off state, and sends on-off information of the primary battery and the mobile device to the main control module. Based on this, the main control module determines that a connection is reestablished between the primary battery and the mobile device according to the on-off information sent by the power supply control module, and generates a first event instruction. In the embodiments of the present disclosure, a mode of detecting a connection reestablished between the primary battery and the mobile device by the main control chip is not limited.

Based on the same inventive concept described above, the embodiments of the present disclosure further provide a method for switching a battery of a mobile device, and the method is applied to the mobile device according to any of the above embodiments.

FIG. 3a is a flowchart of a method for switching a battery of a mobile device according to an embodiment of the present disclosure, and specifically, the mobile device includes a primary battery 2a and a secondary battery 2b, and the method includes steps S1 and S2, where step S2 includes steps S21 and S22:

In step S1, whether the primary battery 2a and the mobile device are in a power-on state or a power-off state is detected.

Above-mentioned "power-on state" means that the primary battery is electrically connected to the mobile device; "power-off state" means that the electrical connection between the primary battery and the mobile device is interrupted, for example, the primary battery runs out and cannot supply power to the mobile device, and no current is present between the primary battery and the power supply control module; or the primary battery is removed from the mobile device, and no physical connection is present between the primary battery and the mobile device.

In step S21, when it is determined that the primary battery 2a and the mobile device are in the power-on state, the primary battery 2a is controlled to supply power to the mobile device.

In step S22, when it is determined that the primary battery 2a and the mobile device are in the power-off state, the power supply of the mobile device is controlled to be switched from the primary battery 2a to the secondary battery 2b.

In the method for switching a battery of a mobile device according to the embodiments of the present disclosure, the primary battery 2a and the secondary battery 2b are both configured to supply power, and the primary battery 2a is used to supply power to the mobile device in a case that the primary battery 2a and the mobile device are in the power-on state, and the secondary battery 2b is used to supply power to the mobile device in the case that the primary battery 2a and the mobile device are in the power-off state. Above-mentioned "the primary battery 2a and the mobile device are in the power-off state" means that the electric quantity of the primary battery 2a is insufficient, the primary battery needs to be replaced. In this case, the secondary battery 2b may be adopted to supply power to the mobile device during the replacement process of the primary battery 2a, such that the mobile device remains the operating state throughout, that is, the primary battery 2a is replaced without the mobile device being powered off, thereby prolonging the battery life of the mobile device and improving the user experience.

In some embodiments, the mobile device includes smart glasses 4, the primary battery 2a and the secondary battery 2b are both configured to supply power to the smart glasses 4.

As shown in FIG. 3a, in step S2, prior to step S21, the method further includes step S20: generating a first switching instruction under the triggering of a first external operation, and controlling the smart glasses 4 to operate in a first working mode in response to the first switching instruction.

Moreover, in step S2, after step S22, the method further includes step S23: generating a second switching instruction under the triggering of a second external operation, and controlling the smart glasses 4 to be switched back from the first working mode to the second working mode in response to the second switching instruction. The power consumption of the smart glasses 4 in the first working mode is less than the power consumption of the smart glasses 4 in the second working mode.

In one example, the smart glasses 4 have functions of image (video) capture, image (video) processing, image (video) display, etc. In the second working mode, the smart glasses 4 may call the above functions normally, and in the first working mode, the smart glasses 4 are adjusted to be in the low power consumption state, and the above functions are all deactivated temporarily. In the case that the smart glasses 4 are in the first working mode, the power requirement of the whole mobile device can be met during the battery replacement process, such that the mobile device remains the operating state throughout, that is, the primary battery 2a is replaced without the mobile device being powered off, thereby prolonging the battery life of the mobile device and improving the user experience.

The replacement process of the primary battery 2a will be described in detail below with reference to the functional module structures built in the mobile device in FIG. 1, and it should be noted that the process depends on the processor structure arranged on the main control module 1. FIG. 3b is a flowchart of another method for switching a battery of a mobile device according to an embodiment of the present disclosure, and as shown in FIG. 3b, the method includes steps S01 to S09.

In step S01, the power supply control module 2 is controlled to perform initialization processing, including: memory allocation, IO resource allocation, etc.

In step S02, an interrupt processing function is configured and the interrupt processing function is configured for triggering when a disconnection or a reconnection between the primary battery 2a and the mobile device is detected.

In step S03, a character device is registered, and a kernel timer is set.

In step S04, a USB processing job is initialized, and a USB notification event is registered.

In step S05, a delay job is initialized.

In step S06, a main work of a kernel is scheduled.

The kernel refers to that a chip adopted by the main control module operates based on a Linux kernel, and program security, network protocol, memory management, process management and drivers are all provided by the Linux kernel.

In step S07, whether the primary battery 2a is connected to the mobile device is determined, if yes, step S08 is executed, and if not, step S09 is executed.

In step S08, the primary battery 2a is used to supply power to the mobile device.

In step S09, the secondary battery 2b is used to supply power to the mobile device.

Figure 4:
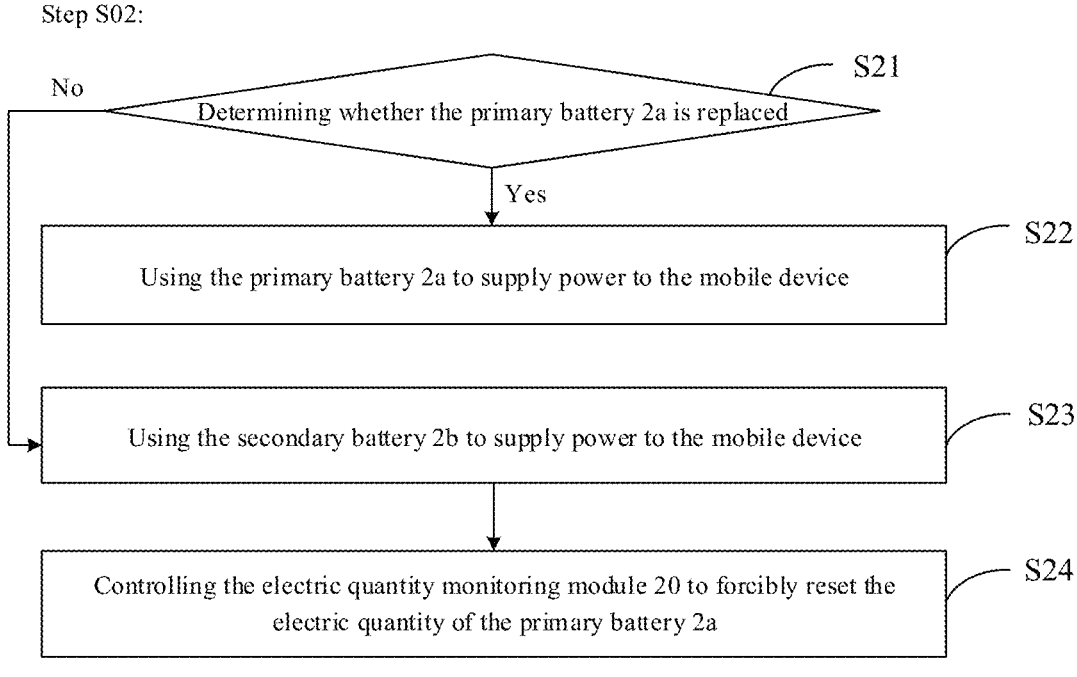
FIG. 4 is a detailed flowchart of step S02 in FIG. 3b.

FIG. 4 is a specific flowchart of step S02 in FIG. 3b, and as shown in FIG. 4, step S02 includes steps S21 to S24, which are specifically as follows.

In step S21, whether the primary battery 2a is replaced is determined, if yes, step S22 is executed, and if not, step S23 is executed.

In step S22, the primary battery 2a is used to supply power to the mobile device, and the process goes to step S24.

In step S23, the secondary battery 2b is used to supply power to the mobile device.

In step S24, the electric quantity monitoring module 20 is controlled to forcibly reset the electric quantity of the primary battery 2a.

It should be noted that step S02 corresponds to the interrupt processing function configured in the main control module 1, that is, judging the state of the primary battery 2a does not mean judging whether the primary battery 2a and the mobile device are in a power-on state, but whether the primary battery 2a is reconnected to the mobile device, that is, whether the replacement is completed, and the electric quantity is reset through the electric quantity monitoring module 20 after the replacement is completed.

In addition, in the process of controlling the electric quantity monitoring module 20 to forcibly reset the electric quantity of the primary battery 2a, the event notification module 12 may be a notifier mechanism program (i.e., blocking notifier chains) configured in the Linux kernel. Event notification is performed among the modules of the kernel through the notifier mechanism, and by using the mechanism, in the case that the main control module 1 determines that the replacement of the primary battery 2a is completed, the event is notified to the electric quantity monitoring module 20, such that the electric quantity is forcibly reset in the electric quantity monitoring module 20. Specifically, the main control module 1 defines its own notifier register and unregister functions by using the notifier API provided by the kernel, and defines a notifier event notification function, where these functions are taken as entries for binding the notifier events, such that the electric quantity monitoring module 20 binds the notifier events using the notifier register function. The notifier event notification function is called after a new primary battery 2a is inserted, and at this moment, the electric quantity resetting thread may be called immediately to reset the electric quantity of the primary battery 2a as the electric quantity monitoring module 20 already binds the notifier events.

Figure 5:
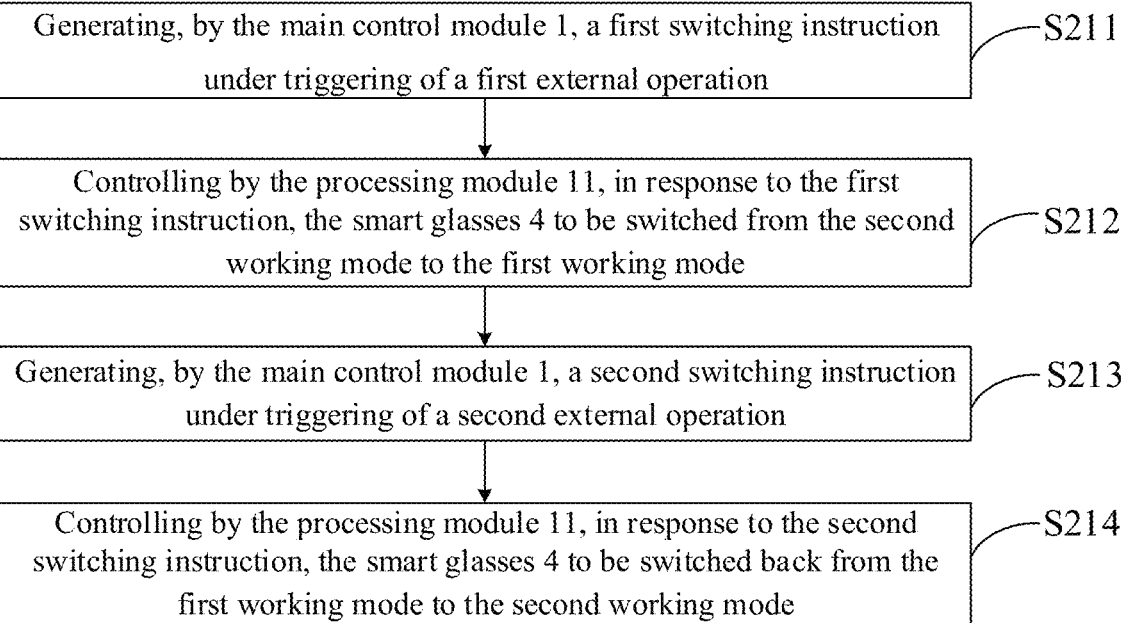
FIG. 5 is a detailed flowchart of step S21 in FIG. 4.

FIG. 5 is a specific flowchart of step S21 in FIG. 4, and as shown in FIG. 5, step S21 includes steps S211 to S214.

In step S211, the main control module 1 generates a first switching instruction under the triggering of a first external operation.

The first external operation is triggered by double-clicking a volume down key on the mobile device by the operator.

In step S212, the processing module 11 controls the smart glasses 4 to be switched from the second working mode to the first working mode in response to the first switching instruction.

At this moment, the operator removes the primary battery 2a that runs out, installs another primary battery 2a having sufficient electric quantity, and triggers a second external operation. Specifically, the second external operation is triggered by double-clicking a volume up key on the mobile device by the operator.

In step S213, the main control module 1 generates a second switching instruction under the triggering of the second external operation.

In step S214, the processing module 11 controls the smart glasses 4 to be switched back from the first working mode to the second working mode in response to the second switching instruction.

Figure 6:
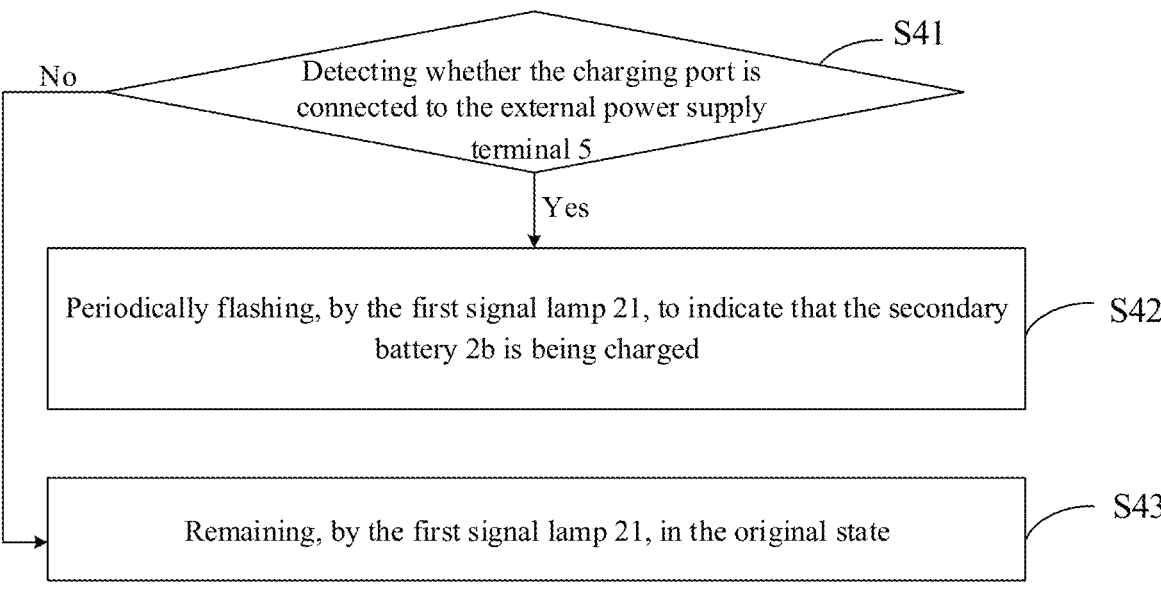
FIG. 6 is a detailed flowchart of step S04 in FIG. 3b.

FIG. 6 is a specific flowchart of step S04 in FIG. 3b, and as shown in FIG. 6, step S04 includes steps S41 to S43, which are specifically as follows.

In step S41, whether the charging port is connected to the external power supply terminal 5 is detected, if yes, step S42 is executed, and if not, step S43 is executed.

In step S42, the first signal lamp 21 periodically flashes to indicate that the secondary battery 2b is being charged.

In step S43, the first signal lamp 21 remains in the original state.

Figure 7:
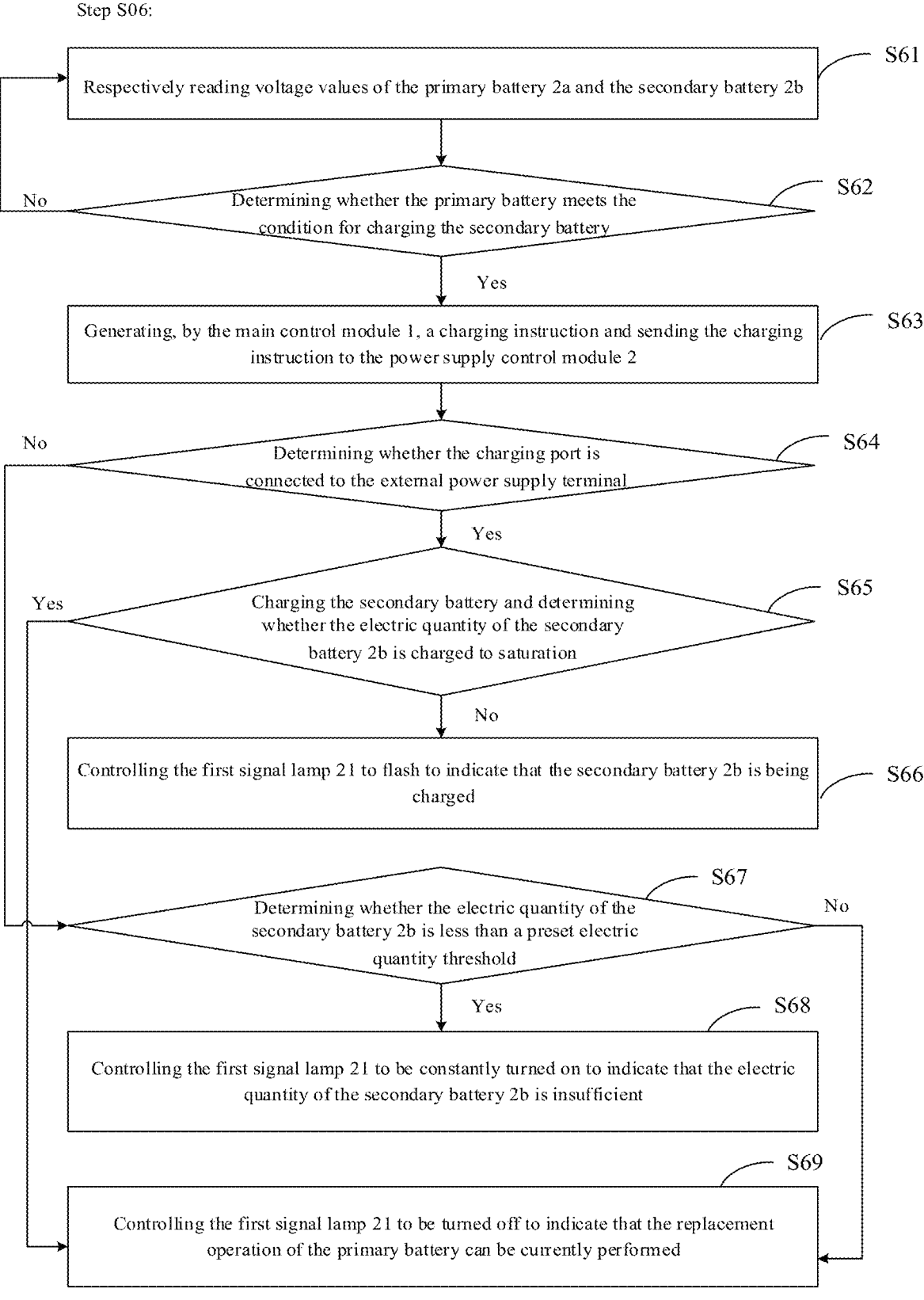
FIG. 7 is a detailed flowchart of step S06 in FIG. 3b.

FIG. 7 is a specific flowchart of step S06 in FIG. 3b, and as shown in FIG. 6, step S06 includes steps S61 to S69. It should be noted that step S06 is a periodic execution operation of the kernel layer, with an execution period of 10 s, which is specifically as follows.

In step S61, voltage values of the primary battery 2a and the secondary battery 2b are read, respectively.

In step S62, whether the primary battery 2a meets the condition for charging the secondary battery 2b is determined, if yes, step S63 is executed, and if not, the process returns to step S61.

In step S63, the main control module 1 generates a charging instruction and sends the charging instruction to the power supply control module 2, such that the power supply control module 2 allows the primary battery 2a to output the power to the secondary battery 2b.

In step S64, whether the charging port of the charging module 3 is connected to the external power supply terminal 5 is determined, if yes, step S65 is executed, and if not, step S67 is executed.

In step S65, the secondary battery is charged, and whether the electric quantity of the secondary battery 2b is charged to saturation is determined, if yes, step S69 is executed, and if not, step S66 is executed.

In step S66, the first signal lamp 21 is controlled to flash to indicate that the secondary battery 2b is being charged.

In step S67, whether the electric quantity of the secondary battery 2b is less than a preset electric quantity threshold is determined, if yes, step S68 is executed, and if not, step S69 is executed.

In step S68, the first signal lamp 21 is controlled to be constantly turned on to indicate that the electric quantity of the secondary battery 2b is insufficient.

In step S69, the first signal lamp 21 is controlled to be turned off to indicate that the replacement operation of the primary battery 2a can be currently performed.

Figure 8:
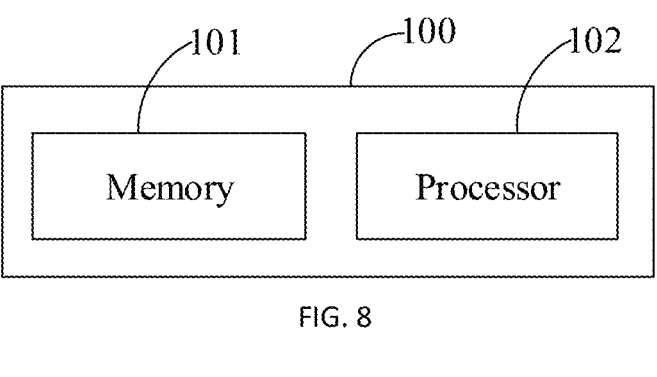
FIG. 8 is a schematic structural diagram of a device for switching a battery of a mobile device according to an embodiment of the present disclosure.

FIG. 8 is a schematic structural diagram of a device for switching a battery of a mobile device according to an embodiment of the present disclosure, and as shown in FIG. 8, an electronic device 100 includes: a memory 101 having a computer program stored therein and a processor 102, wherein the computer program, when executed by the processor 102, causes the electronic device to perform the method for switching a battery of a mobile device as described above, for example, to perform steps S1 to S2 in FIG. 3a.

The electronic device 100 may be a computing device such as a desktop computer, a laptop, a pocket PC, and a cloud server. The electronic device 100 includes, but is not limited to, a processor 102 and a memory 101. It can be understood by those skilled in the art that FIG. 8 is merely an example of the electronic device 100, and does not constitute a limitation of the electronic device 100, and may include more or fewer components than those shown in the figure, or combine certain components, or include different components. For example, the electronic device 100 may further include an input-output device, a network access device, a bus, etc.

The processor 102 may be a central processing unit (CPU), or other general-purpose processor, a digital signal processor (DSP), an application specific integrated circuit (ASIC), a field-programmable gate array (FPGA) or other programmable logic device, a discrete gate or transistor logic device, a discrete hardware component, etc. The general-purpose processor 102 may be a microprocessor or the processor may be any conventional processor or the like.

The memory 101 may be an internal storage unit of the electronic device 100, such as a hard disk or a memory of the electronic device 100. The memory 101 may also be an external storage device of the electronic device 100, such as a plug-in hard disk, a smart media card (SMC), a secure digital (SD) card, a flash card, or the like, arranged on the electronic device 100. Furthermore, the memory 101 may also include both an internal storage unit and an external storage device of the electronic device 100. The memory 101 is configured to store the computer program and other programs and data required by the terminal device. The memory 101 is further configured to temporarily store data that has been output or is to be output.

It may be clearly understood by those skilled in the art that, for convenience and simplicity of description, the division of the functional units and modules is merely exemplary. In practical application, the above functions may be assigned to different functional units and modules as needed, that is, the internal structure of the apparatus may be divided into different functional units or modules to implement all or a part of the above functions. Each functional unit or module in the embodiments may be integrated in one processing unit, or each unit may physically exist alone, or two or more units may be integrated in one unit. The above integrated units may be implemented in the form of hardware or a software functional unit. In addition, specific names of the functional units and modules are merely for convenience of distinguishing from each other, and are not intended to limit the protection scope of the present disclosure. For the specific working processes of the units and modules in the system, reference may be made to the corresponding processes in the foregoing method embodiments, which are not repeated herein.

Figure 9:
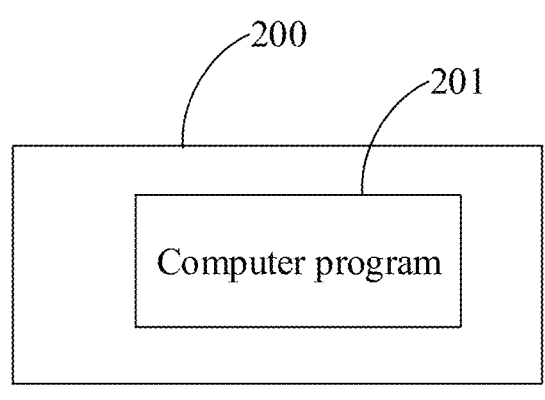
FIG. 9 is a schematic structural diagram of a computer-readable storage medium according to an embodiment of the present disclosure.

FIG. 9 is a schematic structural diagram of a computer-readable storage medium according to an embodiment of the present disclosure, and as shown in FIG. 9, the computer-readable storage medium 200 stores a computer program 201, wherein the computer program 201, when executed by a processor of a device, causes the device to perform the method for switching a battery of a mobile device as described above, for example, to perform steps S1 to S2 in FIG. 3a. The computer-readable storage medium 200 includes, but is not limited to, an RAM, an ROM, an EEPROM, a flash memory or other memory techniques, a CD-ROM, a digital versatile disc (DVD) or other optical disc storage, a magnetic cassette, a magnetic tape, magnetic disc storage or other magnetic storage apparatuses, or any other medium which is configured to store desired information and can be accessed by a computer. In addition, it is well known to those ordinary skill in the art that communication media usually contain computer readable instructions, data structures, program modules or other data in a modulated data signal such as a carrier wave or other transport mechanism, and may include any information delivery media.

It may be understood that the above embodiments are merely exemplary embodiments employed to illustrate the principles of the present disclosure, and the present disclosure is not limited thereto. It will be apparent to those of ordinary skill in the art that various changes and modifications can be made without departing from the spirit and scope of the present disclosure, and these changes and modifications are also considered to fall within the scope of the present disclosure.

The invention claimed is:

1. A mobile device, wherein the mobile device comprises a primary battery and a secondary battery, and the mobile device further comprises a power supply control module and a main control module connected to each other, wherein, the power supply control module is respectively connected to the primary battery and the secondary battery and is configured to detect whether the primary battery and the mobile device are in a power-on state or a power-off state and send on-off information to the main control module; and the main control module is configured to control the primary battery to supply power to the mobile device when it is determined that the primary battery and the mobile device are in the power-on state, and control a power supply of the mobile device to be switched from the primary battery to the secondary battery when it is determined that the primary battery and the mobile device are in the power-off state; and wherein the mobile device further comprises smart glasses, the primary battery and the secondary battery are both configured to supply power to the smart glasses, and the mobile device further comprises a processing module connected to the main control module, wherein, the main control module is further configured to: generate a first switching instruction under triggering of a first external operation, and send the first switching instruction to the processing module, before controlling the power supply of the mobile device to be switched from the primary battery to the secondary battery; and generate a second switching instruction under triggering of a second external operation, and send the second switching instruction to the processing module, after controlling the primary battery to supply power to the mobile device; and the processing module is configured to: control the smart glasses to operate in a first working mode in response to the first switching instruction; and control the smart glasses to operate in a second working mode in response to the second switching instruction; wherein power consumption of the smart glasses in the first working mode is less than power consumption of the smart glasses in the second working mode.

2. The mobile device according to claim 1, wherein the mobile device further comprises an electric quantity monitoring module connected to the primary battery, and the electric quantity monitoring module is configured to monitor electric quantity of the primary battery;

the mobile device further comprises an event notification module respectively connected to the main control module and the electric quantity monitoring module, the main control module is further configured to generate a first event instruction and send the first event instruction to the event notification module when it is detected that the primary battery is reconnected with the mobile device; and the event notification module is configured to control the electric quantity monitoring module to reset the electric quantity of the primary battery under triggering of the first event instruction.

3. The mobile device according to claim 2, wherein the electric quantity monitoring module is specifically configured to:

call an electric quantity resetting thread to detect and reset the electric quantity of the primary battery, under control of the event notification module; and allow a current variation range generated by the primary battery within a preset time period to be greater than 0.5 A and/or allow a voltage variation range generated by the primary battery within a preset time period to be greater than 1 V under the electric quantity resetting thread, and wherein the preset time period is less than 10 s.

4. The mobile device according to claim 1, wherein the main control module is further configured to:

monitor electric quantity of the secondary battery;

control a first signal lamp to be constantly turned on to indicate that the electric quantity of the secondary battery is insufficient, when it is determined that the electric quantity of the secondary battery is lower than a preset electric quantity threshold, wherein the preset electric quantity threshold is a minimum electric quantity value required by the mobile device during a replacement process of the primary battery; and control the first signal lamp to be turned off, when it is determined that the electric quantity of the secondary battery is not lower than the preset electric quantity threshold.

5. The mobile device according to claim 4, wherein before controlling the power supply of the mobile device to be switched from the primary battery to the secondary battery, the main control module is further configured to:

generate the second switching instruction in response to the second external operation, in a case that the first signal lamp is turned off.

6. The mobile device according to claim 4, wherein, the main control module is further configured to monitor a voltage value of the primary battery and a voltage value of the secondary battery, respectively; and send a charging instruction to the power supply control module in a case that the first signal lamp is constantly turned on and it is determined that the voltage value of the primary battery is greater than the voltage value of the secondary battery; and the power supply control module is further configured to charge the secondary battery through the primary battery under control of the charging instruction.

7. The mobile device according to claim 6, wherein the main control module is further configured to control the first signal lamp to flash during a charging process of the secondary battery.

8. The mobile device according to claim 6, wherein the mobile device further comprises a charging module, the charging module is respectively connected to the smart glasses, the primary battery and the power supply control module, and the charging module is provided with a charging port configured to connect one of the smart glasses and an external power supply terminal; and the charging module is configured to:

supply power to the smart glasses in a case that the charging port is connected to the smart glasses; or receive power supplied from the external power supply terminal and charge the secondary battery through the primary battery in a case that the charging port is connected to the external power supply terminal.

9. The mobile device according to claim 8, wherein before sending the charging instruction to the power supply control module, the main control module is further configured to detect the power-on state between the charging module and the external power supply terminal; and wherein, in a case that the charging module is connected to the external power supply terminal, the charging instruction is configured to instruct the power supply control module to receive power supplied from the external power supply terminal and output the power to the secondary battery through the primary battery; and in a case that the charging module is not connected to the external power supply terminal, the charging instruction is configured to instruct the power supply control module to directly output power of the primary battery to the secondary battery.

10. The mobile device according to claim 8, wherein the charging module is further configured to:

supply the power of the primary battery to the smart glasses in a case that the primary battery and the mobile device are in the power-on state, and supply power of the secondary battery to the smart glasses through the power supply control module in a case that the primary battery and the mobile device are in the power-off state.

11. The mobile device according to claim 2, wherein the power supply control module is further configured to:

supply the power of the primary battery or the power of the secondary battery to the main control module and the electric quantity monitoring module.

12. A method for switching a battery of a mobile device, wherein the method is applied to the mobile device as defined in claim 1, the mobile device comprises the primary battery and the secondary battery, and the method comprises:

detecting whether the primary battery and the mobile device are in a power-on state or a power-off state; and controlling the primary battery to supply power to the mobile device when it is determined that the primary battery and the mobile device are in the power-on state; and controlling a power supply of the mobile device to be switched from the primary battery to the secondary battery when it is determined that the primary battery and the mobile device are in the power-off state.

13. The method for switching a battery of a mobile device according to claim 12, wherein before controlling the power supply of the mobile device to be switched from the primary battery to the secondary battery, the method further comprises:

generating a first switching instruction under triggering of a first external operation, and controlling the smart glasses to operate in a first working mode in response to the first switching instruction; and after controlling the power supply of the mobile device to be switched back from the secondary battery to the primary battery, the method further comprises:

generating a second switching instruction under triggering of a second external operation, and controlling the smart glasses to operate in a second working mode in response to the second switching instruction; wherein power consumption of the smart glasses in the first working mode is less than power consumption of the smart glasses in the second working mode.

14. A device for switching a battery of a mobile device, comprising:

at least one processor; and a memory in communication connection with the at least one processor; wherein the memory stores one or more computer programs executable by the at least one processor, and the one or more computer programs, when executed by the at least one processor, cause the at least one processor to perform the method for switching a battery of a mobile device as defined in claim 12.

15. A non-transitory computer-readable storage medium having a computer program stored therein, wherein the computer program, when executed by a processor of a device, causes the device to perform the method for switching a battery of a mobile device as defined in claim 12.

16. A method for switching a battery of a mobile device, wherein the method is applied to the mobile device as defined in claim 2, the mobile device comprises the primary battery and the secondary battery, and the method comprises:

detecting whether the primary battery and the mobile device are in a power-on state or a power-off state; and controlling the primary battery to supply power to the mobile device when it is determined that the primary battery and the mobile device are in the power-on state; and controlling a power supply of the mobile device to be switched from the primary battery to the secondary battery when it is determined that the primary battery and the mobile device are in the power-off state.

17. A method for switching a battery of a mobile device, wherein the method is applied to the mobile device as defined in claim 3, the mobile device comprises the primary battery and the secondary battery, and the method comprises:

detecting whether the primary battery and the mobile device are in a power-on state or a power-off state; and controlling the primary battery to supply power to the mobile device when it is determined that the primary battery and the mobile device are in the power-on state; and controlling a power supply of the mobile device to be switched from the primary battery to the secondary battery when it is determined that the primary battery and the mobile device are in the power-off state.

18. A device for switching a battery of a mobile device, comprising:

at least one processor; and a memory in communication connection with the at least one processor; wherein the memory stores one or more computer programs executable by the at least one processor, and the one or more computer programs, when executed by the at least one processor, cause the at least one processor to perform the method for switching a battery of a mobile device as defined in claim 13.

19. A non-transitory computer-readable storage medium having a computer program stored therein, wherein the computer program, when executed by a processor of a device, causes the device to perform the method for switching a battery of a mobile device as defined in claim 13.

* * * * *